United States Patent
Shmuylovich et al.

(10) Patent No.: US 7,600,229 B1
(45) Date of Patent: Oct. 6, 2009

(54) METHODS AND APPARATUS FOR LOAD BALANCING PROCESSING OF MANAGEMENT INFORMATION

(75) Inventors: Samuil Shmuylovich, Framingham, MA (US); Ilya Liubovich, Shrewsbury, MA (US); Eric Young, Alexandria, VA (US); Dongjun Sun, Marlborough, MA (US); Boris Farizon, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 898 days.

(21) Appl. No.: 10/675,220

(22) Filed: Sep. 30, 2003

(51) Int. Cl.
*G06F 9/46* (2006.01)

(52) U.S. Cl. .................. 718/105; 718/104

(58) Field of Classification Search ............. 718/102, 718/105, 104; 709/225, 203
See application file for complete search history.

(56) References Cited

U.S. PATENT DOCUMENTS

| | | | | |
|---|---|---|---|---|
| 5,155,851 A | * | 10/1992 | Krishnan | 718/105 |
| 5,287,508 A | * | 2/1994 | Hejna et al. | 718/102 |
| 5,825,759 A | * | 10/1998 | Liu | 370/331 |
| 6,085,215 A | * | 7/2000 | Ramakrishnan et al. | 718/102 |
| 6,658,449 B1 | * | 12/2003 | Brenner et al. | 718/105 |
| 2002/0169820 A1 | * | 11/2002 | Sayan et al. | 709/203 |
| 2004/0186904 A1 | * | 9/2004 | Oliveira | 709/225 |

* cited by examiner

*Primary Examiner*—Van H Nguyen
*Assistant Examiner*—Eric C Wai
(74) *Attorney, Agent, or Firm*—Chapin IP Law, LLC

(57) ABSTRACT

Mechanisms and techniques for processing information in a management application, such as a storage area network management application, include a load manager, a set of distributed agents that collect information, and a set of store process that store the agent-collected information. The load manager receives load information from a plurality of store processes. The load information indicates a relative processing load for respective store processes. The load manager determines store process availability based on the received load information. The load manager receives a store assignment request from an agent that has an agent transaction to perform with a store process and assigns a store process of the plurality of store processes for the agent to use to perform the agent transaction based on the determined store process availability. In addition, other embodiments include the use of agent transaction weights to allow the store process and/or the load manager to further load-balance agent transactions between store processes.

21 Claims, 6 Drawing Sheets

METHODS AND APPARATUS FOR LOAD BALANCING PROCESSING OF MANAGEMENT INFORMATION

FIELD OF THE INVENTION

The present invention generally relates to computer and software systems that manage network entities, and more particularly, to systems and techniques that allow for processing of managed entity data.

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems. Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install one or more distributed storage area network management software applications within the storage area network to manage or administer the various elements (i.e., devices, computer systems, storage systems, etc.) that operate within the storage area network. A network manager (i.e., a person) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems but that collectively interoperate together to perform network management. As an example, conventional designs of storage area network management applications can include console, server, agent and storage software components.

Generally, the server component operates as a central control process within the storage area network management application and coordinates communication between the console, storage and agent components. The console component often executes within a dedicated storage area network management workstation to allow the network administrator to visualize and remotely control and manage the various elements within the storage area network that are graphically represented within the console. Agent components execute on host computer systems such as servers within the storage area network to manage storage area network elements. As an example, there may be different respective agents specifically designed (e.g., coded) to remotely manage and control data storage systems, database applications, switches, and so forth. Agent components receive remote management commands from the server component and apply functionality associated with those management commands to the managed elements within the storage area network for which those agents are designated to manage. Agents are also responsible for periodically collecting configuration or management data concerning the storage area network elements that those agents are responsible for management. Agents can transmit this collected management data back to a storage component. The storage component receives the collected management data from the agents and processes and stores this information into a storage area network management database for access by the server component. The console component can interact with the server component to obtain current information such as performance, capacity, load or other data concerning managed elements within the storage area network by accessing the element configuration data in the network management database.

SUMMARY

Conventional mechanisms and techniques for managing the collection and processing of management data for managed entities within management applications suffer from a variety of deficiencies. In particular, the design of conventional storage area network management applications often uses a large number of agent components that each remotely operate to collect management data concerning the managed entities that those agents manage. Each agent is responsible for periodically transmitting the collected set of management and configuration data to a storage process that processes the management data for storage into a management database or other accessible management data repository. Depending upon the size and complexity of the network, the processing tasks involved with collecting and processing management data from many agents by storage processes that store this data within the centralized network management database can consume significant processing resources.

Specifically, in conventional management application implementations, the storage component that receives the management data from the agents must perform complex post-processing of the collected management data for proper placement into the network management database. This post-processing operation of management data can involve parsing, converting and mapping large amounts of collected raw entity data (e.g., character string data or field delimited data) for placement into data structures such as objects corresponding to the managed entities in the storage area network. Since many agents can transmit management data at various times to storage processes (e.g., upon startup of the agent, upon detecting a change to the managed entity under control of an agent, and often at predetermined periodic intervals such as nightly at midnight), the storage process in conventional management applications can become overburdened with processing of management data from agents at certain times. In a worst-case scenario, the processing burden becomes so large that effective throughput of the storage component is diminished resulting in substantial impairment of performance of the overall storage management application with regard to real-time access and presentation of network conditions to the network administrator.

In some conventional implementations, the storage component of the management application can queue up management data transactions during busy time periods when many agents transmit large amounts of management data to the storage process for placement into the management database. Agent transactions may be queued for significant amounts of time thus resulting in processing delays with respect to population of the storage area network management database with the most current management data collected from agents. Delays in processing management data can impact accurate reporting of the current state of managed entities in the storage area network management application.

Embodiments of the invention operate to significantly overcome these and other deficiencies associated with conventional mechanisms and techniques for processing of management data in a management application. In particular, embodiments of the invention provide a low overhead load manager mechanism for load balancing of the processing of management data for placement into a management database between agents and storage processes. Embodiments of the invention are useful to any type of management application that operates to manage managed entities of any type. As explained herein the example management application is a network management application such as used to manage a storage area network. It is to be understood that the principles of the invention can be used for collection and processing of any type of management data for any type of management application and that managed entities as explained herein are not limited to storage area network devices. By implementing a load balancing technique for collection and storage of management data provided from agent components to store processes, embodiments of the invention significantly increase the reliability of management applications and allow such applications to provide more timely feedback of events derived from management data placed into the network management database. In addition, since embodiments of the invention as will be explained provide a feedback mechanism that enables individual store processes to indicate load information (e.g., current resource utilization) to a load manager (i.e., management server) process which can then assign agent transactions to individuals store processes (i.e., based on their respective loads), each store process does not become overburdened with too many agent transactions at one time. In addition to using load information from store processes, embodiments of the invention can include the ability to identify agent transaction weights associated with agent processes and can allow calculation of collective transaction weights of in-progress agent transactions being handled by store processes. Furthermore, load balancing according to embodiments of the invention can take into account situations in which not every agent can communicate with every store process due, for example, to agents and store residing on different isolated sub-networks. Using this information, the load balancing techniques explained herein provide a robust yet lightweight load balancing mechanism that account for store processing resource loads and assigned agent transaction loads to manage processing of agent transactions for conversion of management data into useable managed object data in a management application. Accordingly, the effective throughput of each store process is not compromised and system reliability is increased.

More specifically, according to a management application configured with a load manager in accordance with embodiments of the invention, a plurality of store processes can concurrently operate to process agent transactions for placement of management data or other information into a network management database or repository, such as a managed object database. To provide for load balancing, each store processes tracks or otherwise calculates current load information for itself, such as its current consumption of central processing unit (CPU) and memory resources. Each store processes periodically reports this load information to a load manager process that may operate, for example, as a thread or sub-process within a management server process associated with a management application. The load manager process receives the load information from each store processes and determines store process availability of the store processes based on the received load information. Agent processes that desire to perform or submit an agent transaction to a store process for placement of agent-collected management data into the network management database first provide or transmit a store assignment request to the load manager. The store assignment request indicates to the load manager that the agent has an associated agent transaction to perform with a store process. The load manager receives the store assignment request from the agent and assigns, using load-balancing techniques explained herein, a store process (i.e., of the plurality of operating and available store processes) for the agent to use to perform the agent transaction based on the determined store process availability. In this manner, the load manager operates as an arbitrator for assignment of agents to store processes and utilizes load information associated with each store process as a basis for the agent assignments to store processes.

Embodiments of the invention repeat the processing operations of receiving load information, determining store process availability, receiving a store assignment request from an agent and assigning a store process such that, over time, assignment of store processes to handle processing of agent transactions is load balanced across the plurality of store processes based on the load information from the store processes.

Embodiments of the invention can include other features as well. For example, some embodiments utilize threshold load factors or ranges to determine store process availability based on the received load information. As an example, in one embodiment, for each store process, if the load information for that store process is within an acceptable threshold load factor range, the load manager can identify that store process as an available store process within the plurality of store processes. A load table, object or other data structure identifying store processes and associated load information can be used to maintain such information. Alternatively, if the load information for that store process is not within an acceptable threshold load factor range, the load manager identifies that store process as an unavailable store process within the plurality of store processes. This processing can be continually performed such that when load information for a store process is within the acceptable threshold load factor range, the load manager identifies the store process as being available for processing agent transactions.

Under heavy load situations, in one embodiment, the load manager may identify a non-available store condition in which load information for all store processes of the plurality of store processes is not within an acceptable threshold load factor. As an example, if many agents are programmed to all require processing of agent transactions at the same specific time of the day, such as midnight (a condition referred to as midnight madness since many network administrators often program agents to report management data at midnight each evening), the arrival of numerous store assignment requests may result in the load manager assigning agent transactions to all available store processes in such a quantity over a short period of time so as to cause an increase in the load information reported by those store processes beyond the threshold load factor. According to this embodiment of the invention, during this non-available store condition, in response to receiving a store assignment request from an agent, the load manager maintains an agent wait table containing agent entries that identify store assignment requests associated with the agents. Each agent entry in the agent wait table identifies corresponding wait times for agents that have supplied store assignment requests for processing an agent transaction with a store processes.

In one configuration, if a wait time for an agent identified in an agent entry in the agent wait table exceeds an agent wait threshold, the load manager identifies that agent entry in the agent wait table as a "starving" agent entry. If there is at least one starving agent entry identified in the agent wait table, and if the store assignment request is received from an agent associated with a starving agent entry, and if there is at least one store process of the plurality of store processes that is identified as an available store process (e.g., once the load decreases over time below the threshold for a store process), then the load manager assigns an available store process that has the most favorable load information as a selected store process for use in processing the agent transaction for the agent identified in the starving agent entry in the agent wait table. In this manner, preference is given to agents that have been waiting the most amount of time for assignment of a store processes to handle their associated agent transaction (as opposed to just servicing the first requesting agent). By tracking which agents have been waiting the longest (i.e., according to starving agent entries in the agent wait table), when a store process becomes available, the load manager configured in this embodiment of the invention will avoid assigning that store process to an agent that more recently requested assignment of store process if other agents have been waiting longer. Since each agent periodically transmits a store assignment request to the load manager, the load manager can wait until a starving agent supplies a store assignment request. As such, the load manager forwards a store assignment response identifying the selected store process to the agent providing the store assignment request corresponding to the starving agent entry in the agent wait table and removes the starving agent entry from the agent wait table.

Other embodiments of the invention include the use of transaction weights to compute collective agent transaction assignment weights to store processes. By tracking which agent transactions are currently in progress by which store processes, this information in combination with load information reported by store processes can be used to perform weighted load balancing. The load information reported by store processes may not reflect upcoming processing requirements of agent transactions that incur a light load early on in their transaction life. As an example, a transaction that last 20 seconds may impose only a light load on the store process for the first 15 seconds, but may impose a very heavy burden for the last five seconds. Accordingly, in some embodiments, load information only reflects the current snapshot of actual load and does not account for transactions that have higher processing requirement later in their transaction processing life. To account for this, embodiments of the invention can use transaction weights as explained herein that can account for a heavy transaction that starts out lightly.

Other embodiments of the invention include a computerized device, such as a storage computer system or management computer system, workstation or other computerized device configured to process all of the method operations disclosed herein as embodiments of the invention. In such embodiments, the computerized device includes a memory system, a processor, a communications interface and an interconnection mechanism connecting these components. The memory system is encoded with a load manager (or store process) application that when performed on the processor, produces a load manager (or store) process that operates as explained herein within the computerized device to perform all of the method embodiments and operations explained herein as embodiments of the invention.

Other arrangements of embodiments of the invention that are disclosed herein include software programs to perform the method embodiment steps and operations summarized above and disclosed in detail below. More particularly, a computer program product is disclosed that has a computer-readable medium including computer program logic encoded thereon that when performed in a computerized device provides a associated operations of the agent, or the load manager and/or of the store process, each as respectively explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of storage area network management servers, hosts or other entities can also provide the system of the invention. The system of the invention can be distributed between many software process on several computers, or all processes could run on a small set of dedicated computers, or on one computer alone.

It is to be understood that the system of the invention can be embodied strictly as a software program, as software and hardware, or as hardware alone. Example embodiments of the invention may be implemented within EMC's Control Center software application that provides management functionality for storage area network resources and in computerized devices that operate the Control Center software. Control Center is manufactured by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Embodiments of the invention generally provide mechanisms and techniques that implement a low overhead load manager mechanism for load balancing of the assignment of processing responsibility of management data collected by agent processes in a management application for placement into a network management database. Generally, in operation, agent processes periodically collect and transmit the management data to an assigned one of a plurality of operating storage processes according to a load balanced agent/store process assignment technique that assists in reliability of operation of the management application. In a management application architected in this manner, it is important that storage processes do not become overburdened by a requirement to process too much management data. If such a condition occurs, the overall operability of the management application may be impaired due to problems accessing processed management data within a database or other central repository for management data that operates under control of the storage processes.

By implementing a load balancing technique for collection and storage of management data provided from agent software components operating in a network such as a storage area network, embodiments of the invention significantly increase the reliability of management applications and allow such applications to provide more timely feedback of events derived from management data placed into the management database. In addition, since embodiments of the invention provide a feedback mechanism that enables individual store processes to indicate load information to a server process (as will be explained) which can then assign agent transactions to individuals store processes (i.e., based on their respective loads), each store process does not become overburdened with too many agent transactions at one time. Accordingly, the effective throughput of each store process is not compromised and system reliability is increased. By taking into account the real-time and future processing capacity of a store process (i.e., consumers), embodiments of the invention enable more efficient management of data processing tasks assigned to those store processes from agent processes (i.e., suppliers). Furthermore, embodiments of the invention are able to distribute work load in a controllable manner between individual store process by providing, for example, load factor thresholds that can be different for different store processes. Thus if one storage computer system that is less powerful (e.g., has a slower processor) that another, the threshold load factors for store processes operating on these respective computer systems can be adjusted to compensate for this to limit the assigned work load to the store process operating on the slower computer system.

Figure 1:
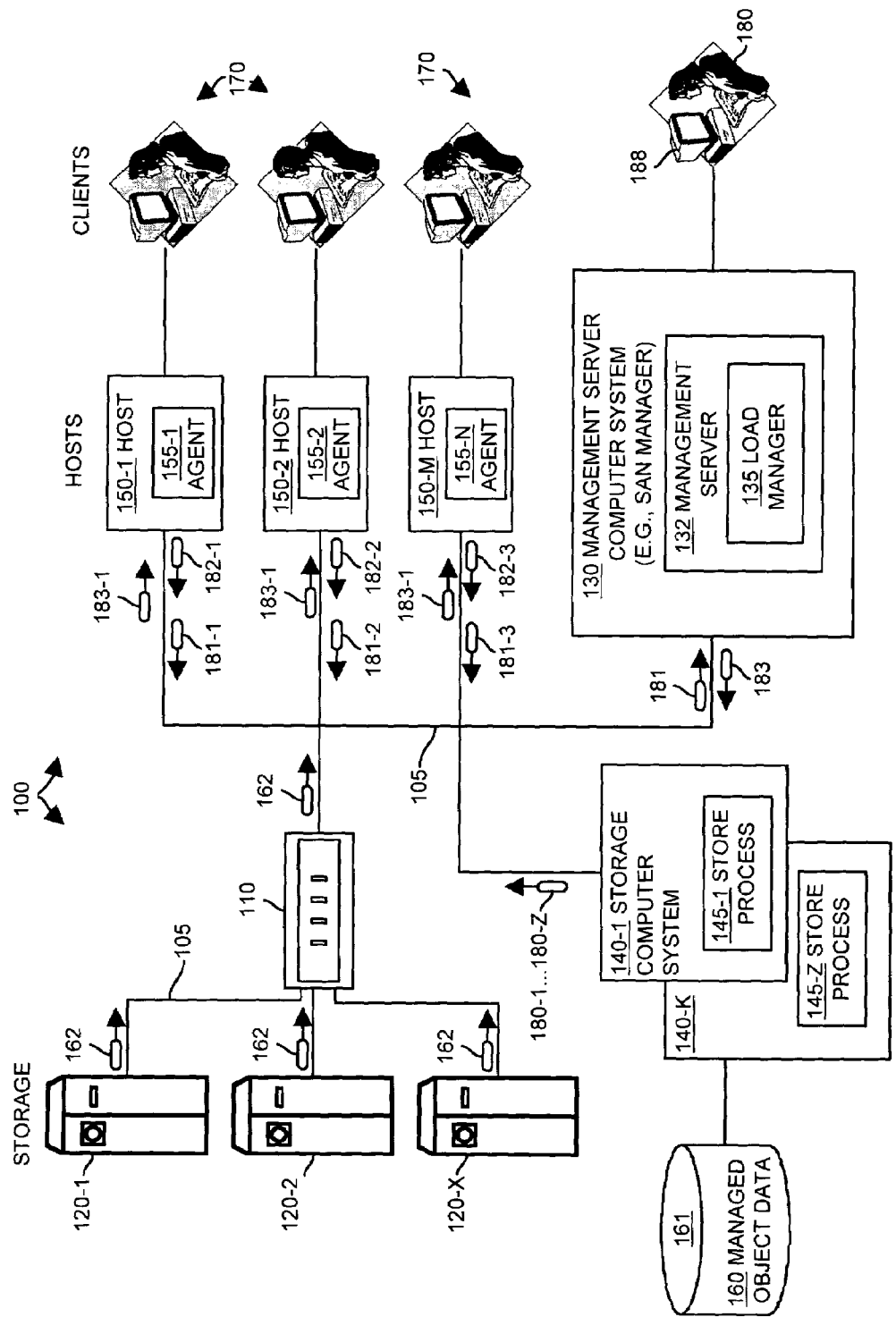
FIG. 1 illustrates an example storage area network and computing system environment including a load manager, agent and store processes configured to operate according to embodiments of the invention.

FIG. 1 illustrates an example of a networking environment suitable for use in explaining example embodiments of the invention. In this example, the networking environment is a storage area network 100 that includes a communications medium 105 that interconnects a plurality of data storage systems 120-1 through 120-X through one or more connectivity devices 110 (e.g., storage area network switches) to a plurality of host computer systems 150-1 through 150-M. According to the general operation of the storage area network shown in FIG. 1, client computer systems 170 can operate various client software applications (not specifically shown) that communicate with server applications (not specifically shown) operating within the host computer systems 150 in order to access data stored within the data storage systems 120 over the storage area network 100.

Also illustrated in this example storage area network 100 is a management server computer system 130 that operates a management server 132 that includes a load manager 135 configured in accordance with embodiments of the invention. In addition, the storage area network 100 includes one or more storage computer systems 140-1 through 140-K that, in this example, operate respective store processes 145-1 through 145-Z also configured in accordance with embodiments of the invention. A plurality of agent software processes 155-1 through 155-M operate within one or more of the host computer systems 150-1 through 150-M as further defined by embodiments of the invention. Generally, the agents 155 and store processes 145 interoperate with, and are collectively considered parts of the management server 132. A network administrator 180 interacts via a console 188 (e.g., another computer system) with the management server 132 executing on the management server computer system 130 in order to remotely administer manageable entities within the storage area network 100 such as the data storage systems 120, the connectivity devices 110 and the host computer systems 150. Note that the console may be a process operating on the management server, a host or the storage computer system.

According to the general operation of embodiments of the invention, the agents 155 operate to periodically collect management data 162 concerning specific managed entities associated with those agents 155. As an example, if the agent 155-1 is responsible for performing management functionality associated with one or more of the data storage systems 120, that agent 155-1 periodically queries or otherwise interacts with those data storage systems 120 for which it is assigned to manage in order to collect management data 162 concerning the performance, configuration and/or other operational characteristics associated with those data storage systems 120. As will be explained, the management server 132 and specifically the load manager 135 operates according to embodiments of the invention to allow the agents 155 to collect and transmit management data 162 to a store process 145 operating within one of the storage computer systems 140 for processing into managed object data 160 for placement into a management database 161. The management server 132 is thereafter able to access (not specifically shown) the managed object data 160 within the management database 161 for interpretation and presentation to the network administrator 180 and for use in other management purposes of managed entities within the storage area network 100.

Prior to storage of the management data 162 into the management database 161 however, the store processes 145 typically pre-process the management data 162 for conversion into managed object data 160. This can involve conversion of raw text or string data 162 into object data 160 for use within the database 161. For a particular set or portion of management data 162 received by a store process 145 from a particular agent 155, this conversion or preprocessing of raw management data 162 into managed object data 160 can require significant processing resources (e.g., processor cycles and/or memory usage) of the storage computer systems 140 upon which the store processes 145-1 through 145-Z execute. Since there are numerous agents 155-1 through 155-N (e.g., N may be greater than several hundred or a thousand or more) that each periodically (and sometimes randomly or in response to certain events) collect and require transmission of management data 160 to a store process 145 for placement as managed object data 160 into the management database 161, the overall processing burden to process all management data 162 collected for all managed entities within the storage area network can 100 can be significant. Accordingly, embodiments of the invention provide the load manager 135 that is capable of making load-balancing decisions regarding load balancing management data processing among store processes 145 and agents 155.

In particular, and as will be explained in more detail herein, the store processes 145-1 through 145-Z in this example embodiment periodically provide load information 180-1 through 180-Z to the load manager 135. The load information 180 generally indicates a current processing burden or load being experienced by each store process 145 as that sore process 145 executes or otherwise operates on its storage computer system 140. As agents 155 collect management data 162 from their associated managed entities, the agents 155 will require the ability to provide an agent transaction 182 to an assigned store process 145 selected by the load manager 135 based on the load information 180 of those store processes 145. To receive an assignment of the store process 145, each agent 155 provides a store assignment request 181 to the load manager 135. The load manager 135 can use the load information 180 of the various store processes 145 in order to make assignments of agents 155 to particular store processes 145 to allow those agents 155 to provide agent transactions 182 for processing of management data collected by those agents 155. Further details of this process performed according to embodiments of the invention will now be explained with respect to the flow chart of processing steps of the load manager 135 shown in FIG. 2 in conjunction with reference to the example storage area network 100 in FIG. 1.

Note that the illustrated example in FIG. 1 is simplified with a single administrator 180 and each store process 145 and each agent 155 operates individually on a respective separate storage or host computer system 140, 150. It is to be understood that this is not limiting to embodiments of the invention and there may be, for example, multiple administrators 180 as well as multiple agents 155 operating on a single host computer system 150. In addition, in an alternative configuration, there may be multiple store processes 145 operating on a single storage computer system 140, though such an arrangement may experience performance contention issues.

Figure 2:
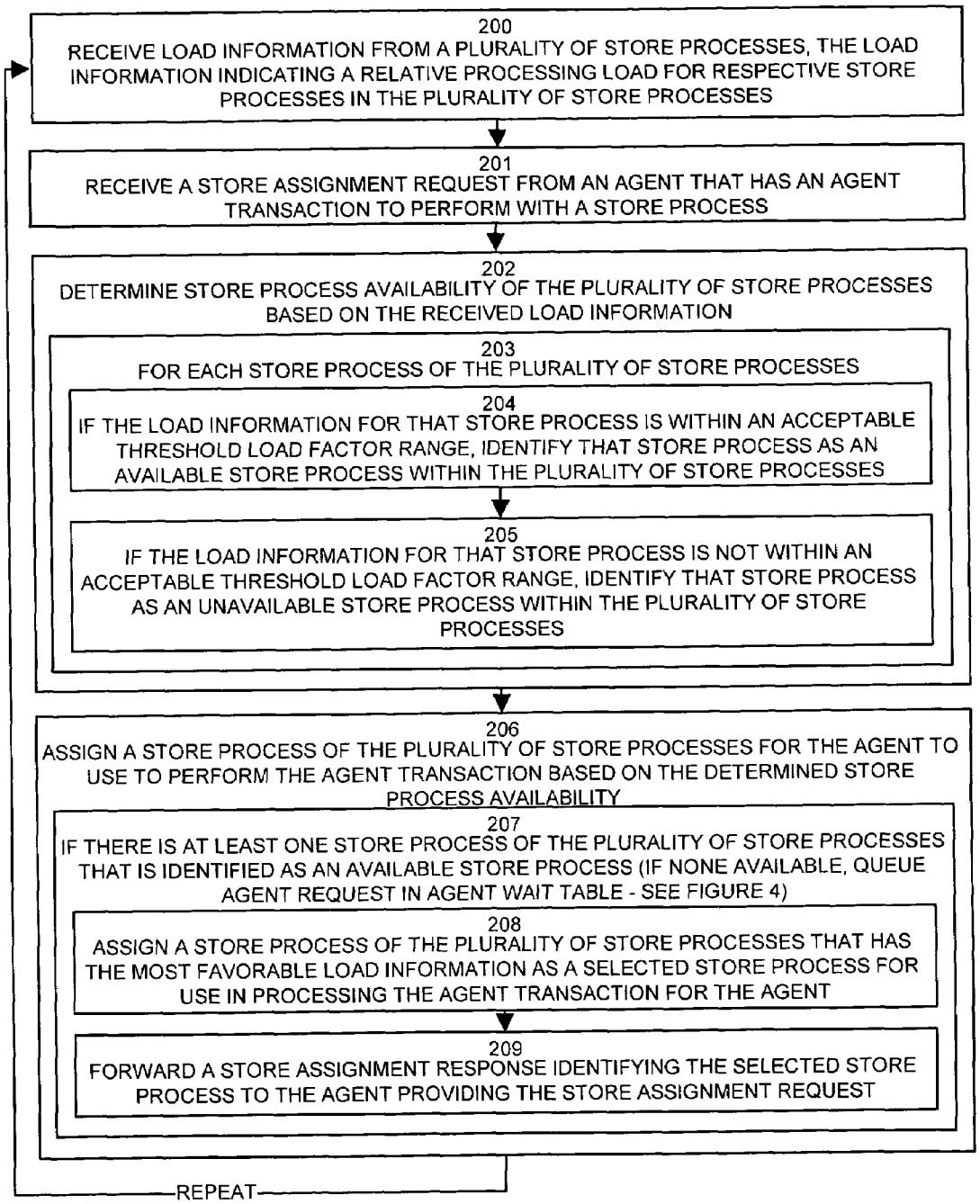
FIG. 2 is a flow chart of processing steps that show the general operation of a load manager process configured to load balance agent request for store processes according to embodiments of the invention.

FIG. 2 is a flow chart of processing steps performed by the load manager 135 in order to load balance the processing of management data 162 for provision to a plurality of store processes in accordance with one example embodiment of the invention.

In step 200, the load manager 135 receives load information 180 (180-1 through 180-Zi example illustrated in FIG. 1) from a plurality of store processes 145 operating in one or more storage computer systems 140. The load information 180 indicates a relative processing load or a "load factor" for respective store processes 145 in the plurality of store processes 145. The load information 180 can include processing system load metrics such as CPU and memory utilization for those store processes 145 executing on the storage computer systems 140. In this example, each store process 145 sends its own respective portion of load information 180-1 through 180-Z to the load manager 135. It is to be understood that load information 180 for multiple store processes 145 could be collected (e.g., by a master store process or by another aggregation process) and transmitted as a single message to the load manager 135. The load manager 135 stores the load information in a load table (e.g., in memory, not shown in this figure but explained in detail in examples below).

Next, in step 201 the load manager 135 receives a store assignment request 181 from an agent 155 that has an agent transaction 182 to perform with a store process 145 (i.e., to be performed upon assignment of that agent to a particular store process). The store assignment request 181 can identify the particular agent 155 requesting access to a store process 145 and can get further identify other information such as the type of agent transaction 182 to be performed with a particular store process 145, an amount of management data 162 to be processed, a current processing load of the agent 155, a transaction weight or burden associated with the agent transaction 182, and other information of interest to the load manager 135. This explanation is given by way of example only and is not intended to be limiting. Note that steps 200 and 201 can be performed independently of each other in an asynchronous manner and thus embodiments of the invention are not limited to the order shown in FIG. 2.

In step 202, the load manager 135 determines store process availability of the plurality of store processes 145 based on the received load information 180 from the active store processes 145. Steps 203 through 205 illustrate details of processing to determine store process availability according to one example embodiment of the invention. In addition, alternative embodiments of the invention that are capable of carrying out variations on such processing will be explained into more detail later.

In step 203, in this example embodiment the load manager 135 enters a processing loop performed for each store process 145 of the plurality of store processes 145-1 through 145-Z (e.g., of all active store processes).

In step 204, within the processing loop defined by step 202, the load manager 135 determines if the load information 180 for that store process 145 (i.e., for that iteration of processing defined by step 202) is within acceptable threshold load factor. If the load information 180 for that store process 145 is within an acceptable threshold load factor, the load manager 135 identifies that particular store process 145 as an available store process within the plurality of store processes. In other words, in step 204, if the load manager 135 determines that load information 180 for a particular store process 145 is within an acceptable threshold load factor, range, or limit, the load manager 135 considers that store process 145 as an acceptable or available choice for assignment to a requesting agent 155 for processing management data 162 within an agent transaction 182 as will be further explained. Note that the processing in step 204 can take additional considerations into account when determining if the load information 180 is within an acceptable threshold load factor. As an example, the load manager 135 can consider how frequently a store process 145 has been assigned to process agent transaction of a previous recent time interval, as will be explained in more detail later.

Alternatively, in step 205, if the load information 180 for that store process 145 is not within the acceptable threshold load factor range, the load manager 135 identifies that store process 145 as an unavailable store process within the plurality of store processes. The load manager 145 can maintain a load table data structure in a database, object, list, array or other data structure that lists all store processes 145-1 through 145-Z executing within the storage computer systems 140-1 through 140-K. This load table data structure can maintain the current state of each store process 145-1 through 145-Z including the respective current load information 180-1 through 180-Z of store processes. An example of a load table configured in accordance with embodiments of the invention will be explained in detail below. For purposes of this explanation, the load table indicates the load information 180 for each store process 145. Other examples of load information could include an indication if an agent was "local" to a particular sun-network or area of a network. If a store process 145 were on a storage computer system on another sun-network, the load manager 135 could factor this into load information for a particular agent 155 when being considered for assignment to a particular store process.

In step 206, in response to receiving the store assignment request 181, the load manager assigns (i.e., performs a selection of) a store process 145 of the plurality of store processes 145-1 through 145-Z for the agent 155 to use to perform the agent transaction 182 based on the determined store process availability. In other words, in step 206 the load manager 135 uses the load information 180 of each store process 145 in this embodiment (and perhaps other information such as agent transaction weight, as explained later in alternative embodiments) to make a determination of which particular store process 145 should be assigned for handling the agent transaction 182 to be provided from an agent 155 that requests that the load manager 135 assign a store process 145. Details of assigning a store process for use by an agent 155 in accordance with one example embodiment of the invention are shown in processing steps 207 through 209 in the flow chart in FIG. 2.

In step 207, the load manager 135 determines if there is at least one store process 145 of the plurality of store processes 145-1 through 145-Z that is identified as an "available" store process (e.g., by consulting a load table indicating the state of each store process as explained above with respect to steps 203 and 204). In step 207, if there is no available store process, the store assignment request can be queued in an agent wait table to be explained later. Assuming for this example embodiment that there is at least one available store process, then processing proceeds to steps 208 and 209.

In step 208, in response to determining that there is at least one available store process 145, the load manager 135 assigns a store process 145 of the plurality of store processes 145-1 through 145-Z that has the most favorable load information 180 as a "selected" store process for use in processing the agent transaction 182 for the agent 155 (i.e., the agent that provided the store assignment request 181 in step 205). In this manner, in step 208 the load manager 135 can select a least-loaded store process 145 from all available store processes (i.e., from all store processes that have an acceptable load factor as expressed by their load information 180 that is within acceptable threshold load factor range) to handle processing of the agent transaction 182 for the agent 155 that is requesting assignment of a store process 145.

Next, in step 209 the load manager 135 forwards a store assignment response 183, that identifies the selected store process 145, to the agent 155 that provided the store assignment request 181. In other words, in step 209 load manager 135 sends a store assignment response signal, message, or other indication 183 to the agent 155 requesting assignment of a store process 145 to indicate to that agent 155 which store process 145 that agent 155 is to use to forward the agent transaction 182 (containing the management data 162) to be processed by that store process 145 into managed object data 160. When the agent 155 receives a store assignment response 183, the agent 155 is now able to transmit the agent transaction 182 to the specific assigned store process 145 selected by the load manager 135 to process that agent transaction 182.

In this manner, the load manager 135 performs a centralized load balancing technique to determine which store processes 145 are to process management data from which agents 155. Using this technique, the load manager 135 is able to manage the processing burdens imposed upon the store processes 145 such that no store process 145 become overburdened with a requirement to process too much management data 162, thus maintaining the overall operational stability of the management server 132 and it associated store process 145. Moreover, other benefits of embodiments of the invention include the ability to balance throughput of processing of agent transactions 182 in order to ensure efficient, timely and balanced updates to the managed object database 161.

After step 209 is complete, the load manager 135 can repeat the operations of receiving load information, determining store process availability, receiving a store assignment request from an agent and assigning a store process in a periodic manner as explained herein such that, over time, assignment of store processes 145 to handle processing of agent transactions 182 is load balanced across the plurality of store processes based on the load information from those store processes.

Embodiments of the invention also provide mechanisms and techniques to handle situations in which all store processes 145-1 through 145-Z are experiencing load conditions that exceed the threshold load factor range (e.g., in steps 202 and 206 and their respective sub-steps above). Such conditions can arise, for example, when many agents 155 have recently requested assignment to store processes 145 and thus all store processes 145 are currently busy processing agent transactions 182. The threshold load factor range may be exceeded or reached, for example, when a storage computer system 140 operating one or more store processes 145 exceeds 90 percent of CPU and memory utilization. In such cases, a load manager 135 configured according to embodiments of the invention is capable of keeping track of agents 155 that request assignment of a store process 145 in a data structure referred to herein as an "agent wait table". Generally, an agent wait table keeps track of which agents 155 have requested assignment of store processes 145 and how long ago those agents 155 requested such store process assignment. Using this information as will be explained, the load manager 135 can service agents 155 that are referred to herein as "starving" agents (i.e., agents that have not been assigned to store process for quite some time relative to other requesting agents). In other words, a starving agent is an agent 155 that has requested assignment of a store process 145 but that has not received a store assignment response for some time from the load manager 135 due to unavailability or busy conditions of the store processes 145.

Figure 3:
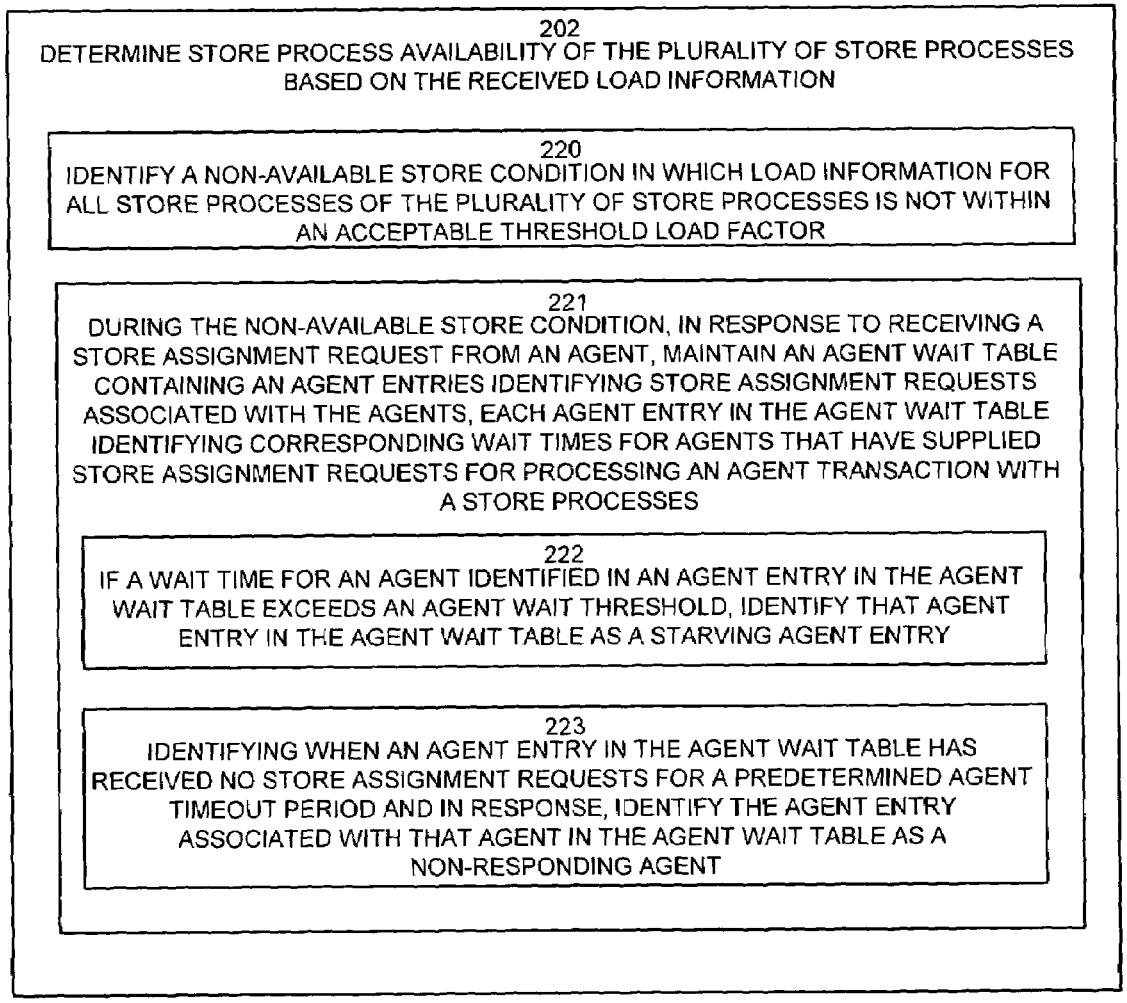
FIG. 3 is a flow chart of processing steps that show details of operation of a load manager process configured to determine store process availability according to embodiments of the invention.

FIG. 3 is a flow chart that shows processing details concerning operation of step 202 from FIG. 2 above to determine store process availability based on load information 180 in accordance with one embodiment of the invention that uses a load table and an agent wait table to detect and contend with unavailable store process conditions.

In step 202, the load manager 135 determines store process availability of the plurality of store processes 145 based on the received load information 180. Sub-steps 220 through 223 use a load table to identify unavailable store process conditions and use an agent wait table to queue store assignment requests on behalf of requesting agents 155.

In step 220, the load manager 135 identifies a non-available store condition in which load information 180 for all store processes 145 of the plurality of store processes 145-1 through 145-Z is not within an acceptable threshold load factor. In other words, in step 220, the load manager 135 analyzes the load information 180 collected from the store processes 145 and determines that each of the store processes 145 is, for example, utilizing CPU, memory or other computing resources of the storage computer systems 140 beyond an acceptable threshold load factor or range such as 90 percent CPU and/or memory utilization. In such cases, all store processes 145 are busy and thus a non-available store condition exists.

To perform step 220, the load manager 135 can maintain the load information 181 through 180-Z from each store process 145-1 through 145-Z in a load table 134, as shown in the example below. The load table 134 below identifies the particular store processes 145 along with their associated load information 180 is illustrated in the following example:

TABLE 1

EXAMPLE LOAD TABLE 134

| STORE PROCESS ID | LOAD INFORMATION | THRESHOLD LOAD FACTOR | NUMBER OF RECENTLY ASSIGNED AGENTS |
|---|---|---|---|
| Store process 145-1 | 92% | 90% | 2 |
| Store process 145-2 | 98% | 90% | 3 |
| ... | | | |
| ... | | | |
| Store process 145-Z | 94% | 92% | 2 |

In the above example load table 134, each row represents load information associated with a particular store process 145. The first column STORE PROCESS ID identifies the particular store processes 145 that reported load information 180 to the load manager 135.

The second column LOAD INFORMATION contains the load information 180 as reported by (or as computed from) the respective store process 145 identified in the first column and in this example is calculated or represented as a percentage of overall load being experienced by that store process 145 as it executes on the storage computer system 140.

The third column THRESHOLD LOAD FACTOR indicates, in this example, the maximum percentage at which the particular store process for this row is considered busy or unavailable in the event that the load information for that store process exceeds the threshold load factor value. In this example, the threshold load factor is set at 90 percent for each of the example store processes 145-1 and 145-2, while store process 145-Z has a threshold load factor of 92%. It is to be understood that percentages are used by way of example only and that other values or performance metrics could be used to indicate load information and corresponding threshold load factors associated with store processes 145.

The NUMBER OF RECENTLY ASSIGNED AGENTS column contains an indication of whether or not the particular store process 145 associated with this row was recently assigned to process in agent transaction 182. In this example, a numerical value is used to indicated a recently assigned agent condition identifying how many agents have been assigned in a recent time period to each particular store process 145. The value that appears in this column (e.g., for store process 145-2), thus indicates that load manager 135 recently assigned the store process 145 to process three agent transactions 182 over a recent elapsed time period (the agent assignment interval, such as 20 seconds). One purpose for this NUMBER OF RECENTLY ASSIGNED AGENTS value is so that the load manager 135 will not assign multiple agent transactions 182 to the same store process 145 in a short period of time. It can be beneficial to avoid this since it may take some time for a store process 145 to have its load information effected by assigned agent transactions 182. As an example, it may take several seconds for an agent transaction to impact the load of a store process 145. Accordingly, if the load manager 135 were to assign a number of agent transactions 182 to the store process in a short period of time, and each were to take a while to impact the reported load 180 of that store process 145, the load manager could potentially very quickly assign too many agent transactions 182 to a single store process 145. As such, this embodiment of the invention uses the NUMBER OF RECENTLY ASSIGNED AGENTS to identify those store processes 145 that have recently been assigned to process agent transactions 182. Further details of this will be explained shortly.

The load manager 135 maintains and updates the load table 134 in memory of the management server computer system 130 upon periodic receipt of load information 180 from each store process 145. In this example, all store processes 145 have load information that exceeds the threshold load factor and thus for this example discussion, a hypothetical non-available store condition does exist at this point in time.

Next, in step 221, during the non-available store condition and in response to receiving a store assignment request 181 from an agent 155, the load manager 135 maintains an agent wait table 133 (see example below) containing agent entries identifying store assignment request 181 associated with the agents 155-1 through 155-N. Each agent entry (e.g., each row) in the agent wait table 133 identifies corresponding wait times for agents 155 that have supplied or transmitted store assignment request 181 to the load manager 135 for processing. Note that the load manager 135 can maintain an agent wait table even when a non-available store condition does not exist in order to track store assignment requests from agents 155 even in light processing conditions.

Accordingly, in step 221 the load manager 135 maintains the agent wait table, list, array, object or other data structure that identifies particular agents 155 that have requested access to store processes 145 but that have been temporarily denied access due to the fact that the store processes 145 have load information that exceeds the acceptable threshold load factor at the time the request was made. Each entry (i.e., each row) in the agent wait table (see example below) identifies store assignment request(s) 181 received by the load manager 135 from agents 155 along with such information as a timestamp indicating when the store assignment request 181 was received. Other information within an agent entry in the agent wait table can include an identity of the particular agent transaction 182 being requested along with a transaction weight or other metric indicating the complexity or load that the particular agent transaction 182 (corresponding to that request 181) will incur when being performed by a store process 145. The following example shows an agent wait table 134 that the load manager 135 can maintain in accordance with one example embodiment of the invention:

TABLE 2

AGENT WAIT TABLE 133

| AGENT IDENTITY | STORE ASSIGNMENT REQUEST ID | ELAPSED REQUEST TIME | AGENT WAIT TRESHOLD | STARVING AGENT INDICATOR | NON RESPONSIVE AGENT INDICATOR |
|---|---|---|---|---|---|
| Agent 155-1 | 182-1 | 6 MIN. | 3 MIN. | X | — |
| Agent 155-2 | 182-2 | 2 MIN. | 3 MIN. |   | — |
| ... |   |   |   |   | — |
| ... |   |   |   |   |   |
| Agent 155-N | 182-N | 5 MIN. | 4 MIN. | X | — |

In the above example agent wait table 133, the first column AGENT IDENTITY contains identities of agents 155 that have pending, outstanding or un-serviced store assignment requests 181. In other words, the agents 155 listed in the agent wait table identify agents waiting for store processes due to the non-available condition indicating that all store processes 145 were busy. The second column STORE ASSIGNMENT REQUEST ID identifies information related to the particular store assignment request 181 that the agents 155 forward to the load manager 135. Depending upon a specific implementation, additional information within the STORE ASSIGNMENT REQUEST ID can include specific information concerning the particular type of agent transaction 182 requested by the store assignment request 181 sent from an agent 155 to the load manager 135.

The ELAPSED REQUEST TIME column indicates a timestamp or other time information indicating how long it has been since the agent 155 associated with that row submitted the first request 181 for access to a store process 145. In this example, agents periodically submit requests 181 until they receive a assignment 183 and the ELAPSED REQUEST TIME column indicates the first request sent from an agent 155 that was unable to be granted a store assigned response 183.

The AGENT WAIT THRESHOLD column indicates a threshold time limit that, if exceeded by the ELAPSED REQUEST TIME value, causes the load manager 135 to consider the agent 155 to be a "starving" agent as indicated in the STARVING AGENT INDICATOR column. As an example, the load manager 135 has indicated both of the agents 155-1 and 155-N as starving agents since their respective elapsed request times of six and five minutes exceed each of their assigned agent wait threshold values of three minutes and four minutes, respectively.

The NON-RESPONSIVE AGENT INDICATOR column is used to identify agents that formerly provided a store assignment request and that were never assigned a store process but that failed to continue to provide store assignment request. In other words, the non-responsive agent indicator column indicates those agents that may no longer require access to store process or possibly because such agents may have failed. There are no non-responsive agents in this hypothetical example.

In step 222, if a wait time (e.g., ELAPSED REQUEST TIME) for an agent identified in an agent entry (i.e., a row) in the agent wait table exceeds its corresponding agent wait threshold, the load manager 135 identifies the agent entry in the agent wait table is a starving agent entry. This is shown in the aforementioned example agent wait table by placing an X in the STARVING AGENT INDICATOR column to identify those agents 155 that have been waiting for a period of time for assignment of a store process that exceeds their assigned AGENT WAIT THRESHOLD value.

In step 223, the load manager 135 identifies an agent entry (i.e., a row) in the agent wait table that has received no store assignment request 181 for a predetermined agent timeout period. In response, the load manager 135 identifies that agent entry associated with that agent in the agent wait table as a non-responding agent. As noted above, the aforementioned agent wait table does not contain non-responsive agents. One purpose of tracking non-responsive agents according to embodiment of the invention is to be able to identify those agents 155 that may have formerly submitted a store assignment request 181 to the load manager 135 but which no longer require access to a store process 145. This may indicate agent or host failure, for example, or may simply indicate that the agent 155, for that particular request 181, no longer requires processing of the agent transaction 182. Note that the load manager 135 can maintain a separate agent entry (i.e., a different row) for each of multiple store assignment requests 181 (i.e., for different types of transactions 182) from the same agent. Thus in some cases, an agent 155 may submit multiple store assignment requests 181 for different types of agent transactions 182 to be processed by store processes 145. In such cases, the load manager 135 can keep an agent entry for each request 181 (i.e., a separate row) in the agent wait table 133.

Embodiments of the invention can utilize the information within the load table 134 and the agent wait table 133 in order to make decisions when assigning a store process 145 to an agent process 155. In particular, the processing of step 206 in FIG. 2 as explained above can utilize such information to make load balancing decisions for assignment of agents 155 to store processes 145. Specific details of example embodiment of the invention that use such information will now be explained with respect to the flow chart of processing steps illustrated in FIG. 4.

Figure 4:
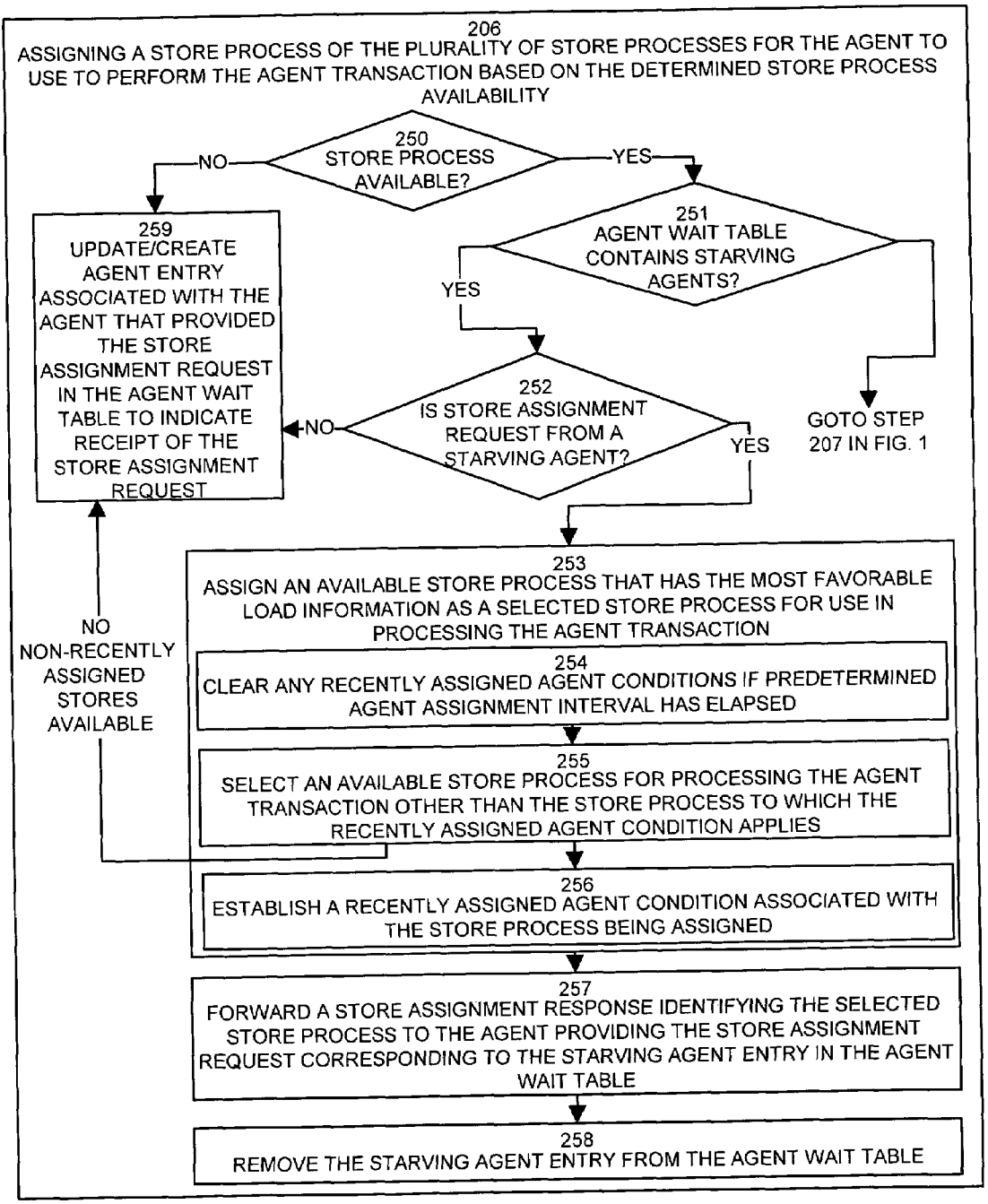
FIG. 4 is a flow chart of processing steps that show details of operation of a load manager process configured to assign store processes to agent according to embodiments of the invention.

FIG. 4 is a flow chart of processing steps performed by a load manager 135 configured in accordance with one embodiment of the invention that utilizes information within the agent wait table 133 and load table 134 when making decisions about assigning store processes 145 to agent processes 155 for processing of agent transactions 182.

In step 206 as explained above with respect to FIG. 2, the load manager 135 assigns a store process of the plurality of store processes for the agent 155 (i.e., the agent submitting the store assignment request 181) to use to perform the corresponding agent transaction 182 based on the determined store process availability. Sub-steps 250 through 259 explained details of this processing according to one example embodiment of the invention.

In step 250, the load manager 135 determines if there is at least one store process 145 of the plurality of store processes 145-1 through 145-Z that is identified as an available store process. The load manager 135 can make this determination by consulting load information within the load table 134 to determine if any store processes 145 have load information that does not exceed the threshold load factor. If no store processes are available for assignment to agents since the load of each store process exceeds its allowable threshold, processing proceeds to step 259.

In step 259, the load manager 135 updates or creates a new agent entry associated with the agent 155 that provided a store assignment request 181 within the agent wait table 133 to indicate receipt of the store assignment request 181. If the agent 155 is initially submitting a store assignment request 181 to the load manager 135 during the existence of the non-available store condition, and the load manager in step 259 can create a new entry in the agent wait table 133 for this new agent-supplied store assignment request 181. Alternatively, if this is a repeat request 181 (e.g., a second, third, forth or subsequent attempt) provided from the agent 155 for assignment of a store process 145, an agent entry may already exist within the agent wait table on behalf of this agent 155 for this request 181. The load manager 135 can use this subsequent or repeat request 181 to update the status of the agent entry within the agent wait table. As an example, this information can be used to reset a counter or timer that, if expires, indicates that a particular agent that formerly submitted a request 181 is no longer responsive due to a lack of subsequent retry requests 181. That is, by "updating" an agent entry in step 259, was meant in one embodiment of the invention is that the load manager 135 can identify that a particular agent entry (i.e., row) should not be marked non-responsive since the agent is still attempting to receive assignment of a store process 145 to process a pending agent transaction 182 associated with that request 181.

Returning attention to step 250, if one or more store processes are available (i.e., have load information below the threshold) as indicated within the load table 134, processing proceeds to step 251.

In step 251, the load manager 135 determines if the agent wait table 134 contains any starving agent entries (i.e., rows) as indicated, for example, by the STARVING AGENT INDICATOR column in the aforementioned agent wait table 133. If there are no starving agents indicated in the agent wait table 133, load manager processing proceeds to step 207 in FIG. 1 to process the store assignment request 181 as explained above in FIG. 2. This processing path (i.e., a no answer in step 251 in FIG. 4) is performed by the load manager 135 in situations in which an agent provides a store assignment request 181 to the load manager 135 during a time in which there is at least one store process available (as determined at step 250) and a time during which no agent in the agent wait table is considered to be a starving agent. As such, since there are no starving agents, the processing path of step 251 to step 207 in FIG. 1 allows the next agent that submits a store assignment request 181 to be assigned to the next available store process 145. Accordingly, even though there may be agents identified in the agent wait table (e.g., due to an earlier non-available store process condition), according to this embodiment of the invention, agents 155 are only assigned to store processes 145 when those agents 155 request such an assignment via a store assignment request 181. In step 251, if there is at least one starving agent, processing proceeds to step 252.

In step 252, the load manager 135 determines if the store assignment request 181 was received from a starving agent. This can be determined by consulting the agent wait table 133 and the identity of the requesting agent (contained in the store assignment request 181). If the store assignment request 181 was not received from a starving agent, processing proceeds to step 259 to update the agent wait table and no assignment of a store process is made to the agent that submitted a store assignment request 181 at this time (i.e., assignment of a store process to the requesting agent is skipped since there are starving agents in the agent wait table). Since the present store assignment request 181 is submitted from an agent that is not starving, the load manager 135 updates the agent wait table in step 259 as explained above to resetting a non-responsive timer to indicate that this agent recently submitted a request (i.e., the agent is still waiting for a store process). In step 252, if the store assignment request 181 received by the load manager 135 is from a starving agent, processing proceeds to step 253.

In step 253, the load manager 135 assigns an available store process 145 that has the most favorable load information (as indicated in the load table 134) as a "selected" store process 145 for use in processing the agent transaction 182 from the agent 155 that submitted the store assignment request 181. Details of this processing are shown in sub-steps 254 through 256. Accordingly, the load manager 135 gives preference to a starving agent that submits a request 181 (assuming there is an available store process as determined in step 250).

In step 254, the load manager 135 resets or clears any recently assigned agent conditions such as the value in the NUMBER OF RECENTLY ASSIGNED AGENTS column above within the load table 134 if a predetermined agent assignment interval has elapsed for those particular store processes 145. In this example embodiment of the invention, the recently assigned agent condition indicated by the NUMBER OF RECENTLY ASSIGNED AGENTS, as briefly explained above, indicates that a particular store process 145 has been recently assigned a certain number of agent transactions 182 in a recent time interval, where "recent" means within a time period set by the agent assignment interval. As an example, the agent assignment interval may be twenty seconds. When an agent transaction 182 is assigned to a store process 145, the processing that takes place within the store process 145 to process that particular agent transaction 182 may have a delayed impact on the load information 181 produced by that store process 145. This is because processing of agent transactions 182 may not impose a heavy load on a store process 145 immediately upon the start of processing of the agent transaction 182. Accordingly, by tracking which store processes 145 have had agent transactions 182 recently assigned and how many (via the value in the NUMBER OF RECENTLY ASSIGNED AGENTS), the load manager 135 will not assign successive agent transactions to a store process if a number of already assigned transactions exceeds a predefined threshold value over a certain agent assignment interval (e.g., 5 transaction in 20 seconds). In step 254 then, the load manager 135 clears any recently assigned agent conditions that have elapsed beyond the agent assignment interval.

Next, in step 255, the load manager 135 selects an available store process for processing the agent transaction 182 other than store processes 145 to which the recently assigned agent condition applies. That is, in step 255 load manager 135 chooses an available store process 145 identified in the load table 134 that has load information below acceptable threshold load factor (e.g., load information below 90% in the example load table shown above) and that does not have a recently assigned load condition. If no such store process exists, processing proceeds to step 259 and no store process 145 is assigned in response to the request 181. Assuming there is at least one store process 145 identified in the load table 134 that meets these conditions, the load manager 135 assigns this store process 145 to the requesting agent 155 using the processing below in steps 256 and 257.

In step 256, the load manager 135 establishes a recently assigned agent condition associated with the selected store process 145 being assigned to an agent 155. In other words, since the store process 145 selected by the load manager 135 in step 255 is being assigned for use by the requesting agent 155, the load manager 135 now identifies this store process 145 in the load table 134 as having recently been assigned to an agent 155.

Next, in step 257 the load manager 135 forwards a store assignment response 183 to the agent 155 that provided the store assignment request 181 corresponding to the starving agent entry in the agent wait table 133. Steps 257 thus allows the load manager 135 to indicate to the agent 155 the identity of the store process 145 which that agent is to use for processing the agent transaction 182.

In step 258, the load manager 135 removes the starving agent entry from the agent wait table 133 that corresponds to the agent 155 for which a store process 145 was assigned in step 257. In this manner, the load manager 135 removes the entry from the agent wait table 133 since this agent is now assigned to a store process 145.

From the aforementioned discussion, embodiments of the invention provide techniques for managing the processing burden of management data between a number of requesting agents 155 and a limited number of available store processes 145.

Figure 5:
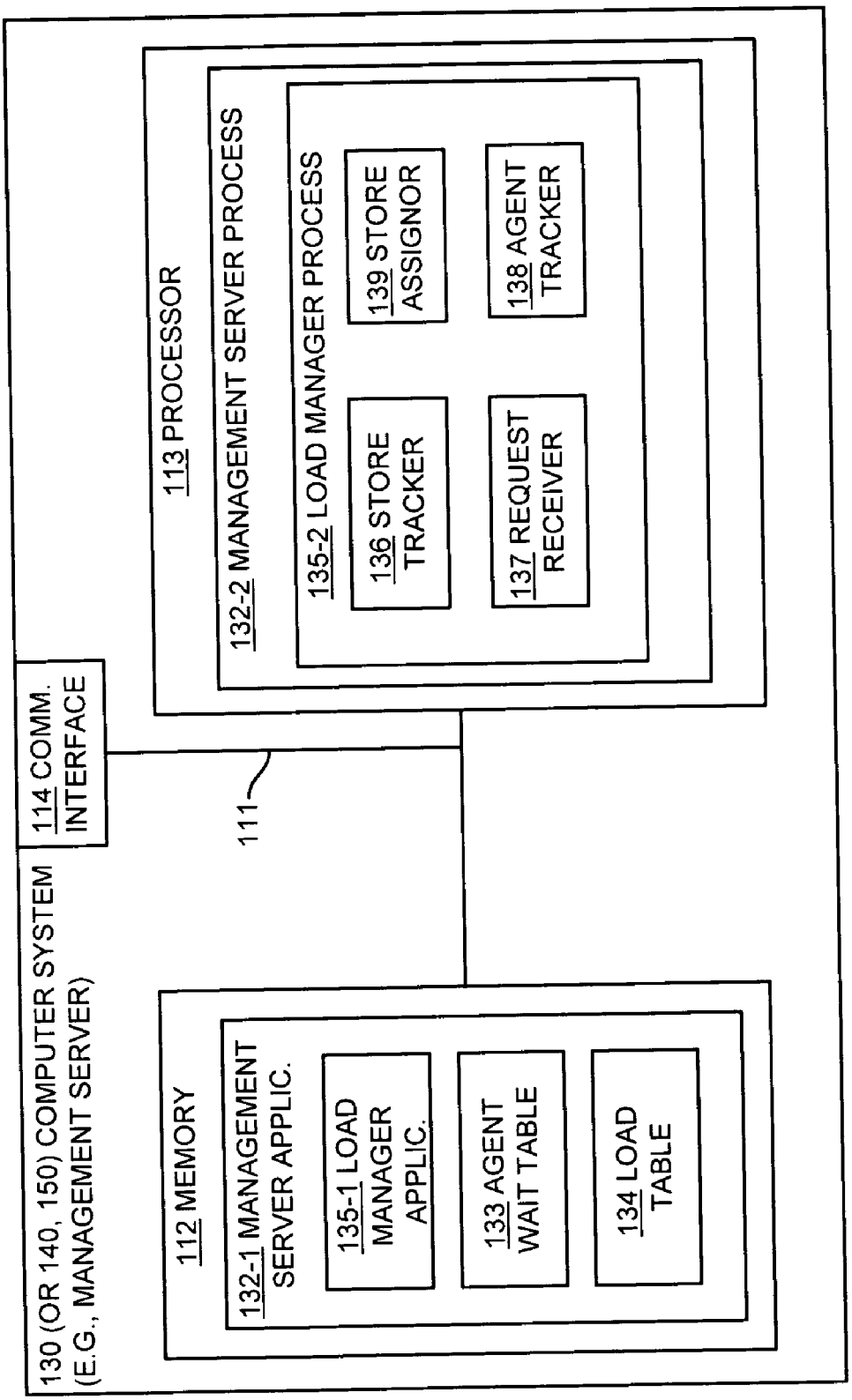
FIG. 5 illustrates example architecture of the management station computerized system from FIG. 1 including an example of a load manager software architecture configured according to embodiments of the invention.

FIG. 5 illustrates an example architecture of the management server computer system 130, such as a storage area network management station, configured according to embodiments of the invention. The computer system 130 may be any type of computerized system such as a personal computer, workstation, portable computing device, mainframe, server or the like. The computer system 130 in this example includes an interconnection mechanism 111 that couples a memory system 112, a processor 113, and a communications interface 114. The communications interface 114 allows the computer system 130 to communicate with devices (i.e., resources) that operate within the network 100.

The memory system 112 is encoded with a management server application 132-1 that includes the load manager application 135-1 as well as the agent weight table 133 and store load information 134. The management server application 132-1 represents software code such as data and/or logic instructions (e.g., stored in the memory or on another computer readable medium such as a disk) that embody the processing functionality of embodiments of the invention. The processor 113 can access the memory system 112 via the interconnection mechanism 111 in order to launch, run, execute, interpret or otherwise perform the logic instructions of the management server application 132-1 in order to produce the management server process 132-2 including a load manager process 135-2. In other words, the management server process 132-2 and load manager process 135-2 represent one or more portions of the management server application 132-1 (or the entire application 132-1) performing within or upon the processor 113 in the computer system 130. It is to be understood that the management server 132 and load manager 135 operating within the computer system 130 illustrated in FIG. 1 are represented in FIG. 2 by either one or both of the management server and load manager application 132-1, 135-1 and/or the management server process and load manager process 132-2, 135-2.

Is to be understood that embodiments of the invention include the applications 132, 135 (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments of the invention can provide the applications 132-1 and 135-1 operating within the processor 113 as the processes 132-2 and 135-2. While not shown in this example, those skilled in the art will understand that the computer system 110 may include other processes and/or software and hardware components, such as an operating system, which have been left out of this illustration for ease of description of the invention.

Also as illustrated in FIG. 5, the load manager application 135-2 includes software components such as the store tracer 136 that maintains the load table 134 by receiving the load information 180 from the store processes 145. The request receiver 137 handles processing tasks associated with receiving the store assignment request 181 from the agents 155. The agent tracker 138 maintains the agent wait table 133 and the store assignor 139 makes decisions regarding assignment of agents 155 to store processes 145 using the information within the agent wait table 133 and the load table 134 as explained above. It is to be understood that the software components 136 through 139 are illustrated by way of example only. While not shown in detail, it is to be understood that the architecture of the storage computer systems 140 and the host computer systems 150 also contain a memory, a processor, a communications interface in an interconnection mechanism as illustrated within the computer system shown in FIG. 5. In the computer systems 140 and 150, the store processes and agent processes can be respectively encoded as software applications within memory and the processor 113 can execute these as processes to provide run-time instantiations of these software programs.

Figure 6:
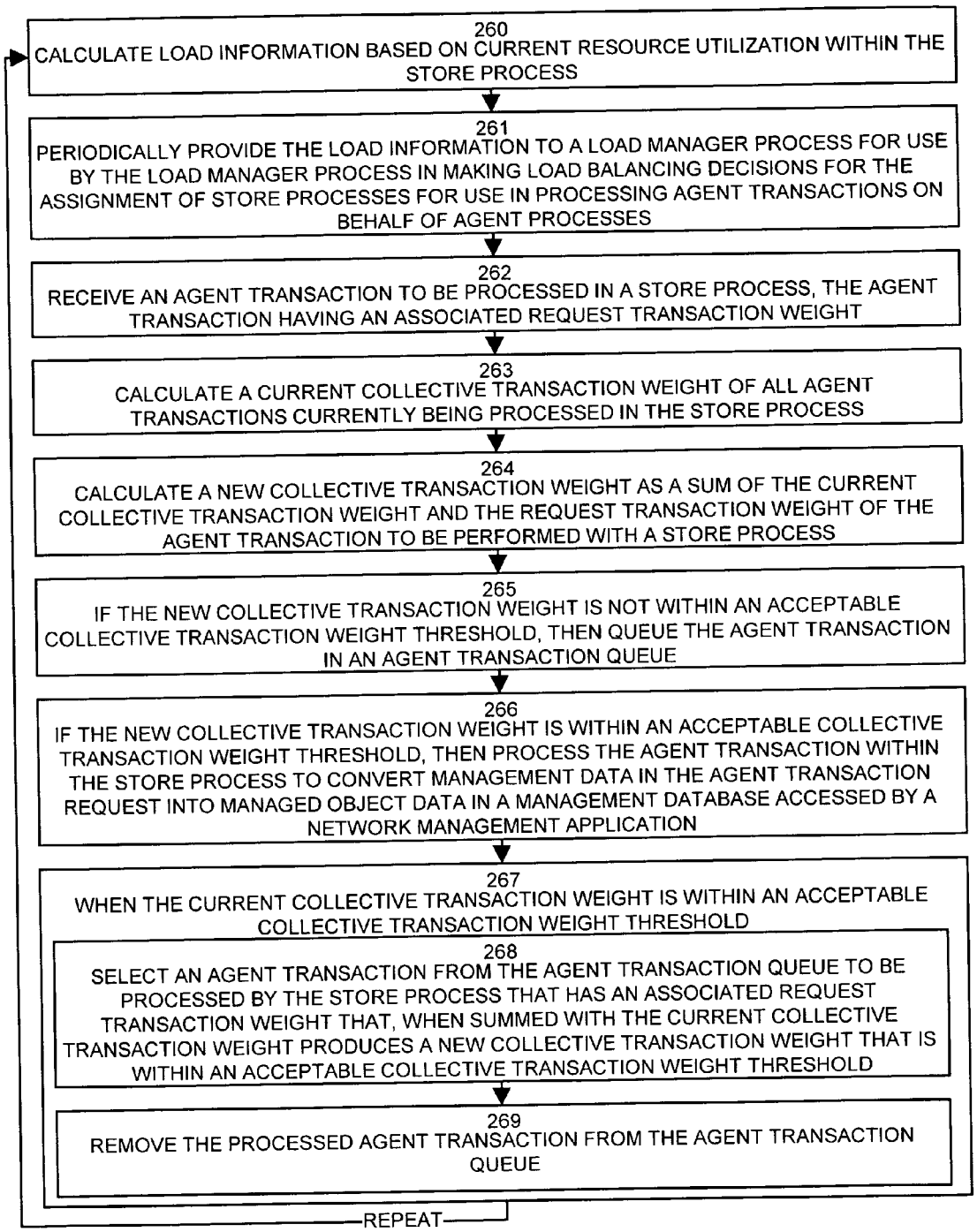
FIG. 6 is a flow chart of processing steps that show the general operation of a store process configured to report load information and process agent transactions using transaction weights according to embodiments of the invention.

FIG. 6 is a flow chart of processing steps performed by a store process 145 configured according to one example embodiment of the invention. In this example embodiment, in addition to the load balancing tasks performed by the load manager 135 as discussed above, the store processes 145 can further perform processing of their own that assists in balancing the performance and processing of agent transactions 182 within the store processes 145. This is done using various queue management and transaction weighting techniques explained below and by assigning processing weight that identifies a relative processing burden associated with a particular agent transaction 182 to be assigned to a store process 145.

In step 260, the store process 145 calculates (e.g., collects or computes) load information (i.e., for itself) based on current resource utilization of the store process 145 executing on the storage computer system 140. This processing can involve obtaining, calculating, identifying or otherwise accessing performance metrics regarding, for example, CPU and memory utilization of the store process 145 as it performs processing of agent transactions 182 on the storage computer system 140. This can be a continuous real time collection process or can be a sample of performance during representative transaction processing times.

In step 261, the store process 145 periodically provides (e.g., transmits) the load information 180 to the load manager 135 for use by the load manager 135 in making load-balancing decisions for the assignment of store processes 145 for use in processing agent transactions 182 on behalf of agent processes 155. This periodic transmission of load information 180 can take place, for example, every 1 second (or any other interval) during execution of the store process 145 on the storage computer system 140. It is to be understood that in this example, the collection and forwarding of load information 180 to the load manager 135 by the store process 145 is done at periodic intervals by way of example only. Other arrangements can involve the load manager 135 periodically querying each store process 145 for load information 180 or alternatively, the store processes 145 can each provide the load information 180 to the load manager 135 in response to some other event such as expiration of the timer or in response to receipt of agent transactions. Note that steps 260 and 261 can be performed concurrently or asynchronously with each other are not dependent upon each other.

In step 262, the store process 145 receives agent transactions 182 to be processed in the store process 145. The agent transactions 182 have an associated transaction weight. This may be a value specified in the transaction 182 itself, or may be determined by the type of transaction 182 to be performed by the store process 145. The transaction weight indicates the relative processing burden that a store process 145 will incur when performing the agent transactions 182. As an example, some agent transactions 182 provided from some agents 185 to store processes 145 have a relatively low transaction weight indicating that the particular agent transactions 182 does not impose a significantly large processing burden upon the store process 145. Alternatively, other agent transactions 182 may include or may identify or may correspond with significantly larger transaction weights that indicate that a store process 145 will experience significant processing burden when performing such a heavily weighted agent transaction 182. As will be explained, the store process 145 can use transaction weights associated with individual agent transactions to calculate the collective transaction weight as a sum of all transaction weights associated with all in-progress agent transactions 182 currently being assigned to, received by, and being performed by the store process 145. This processing as explained in detail below.

In step 263, the store process 145 calculates the current collective transaction weight of all agent transactions 182 currently being process in the store process 145. The current collective transaction weight can include all in-progress agent transactions 182 that the store process 145 is currently performing in order to convert management data 162 contained within those agent transactions 182 into managed object data 160 to be placed into a database 161 or other repository for access by the management application operating within the storage area network 100.

In step 264, the store process 145 calculates a new collective transaction weight as a sum of the current collective transaction weight and the transaction weight of the agent transactions 182 to be performed with the store process 145. In other words, the new collective transaction weight identifies a total transaction weight for a total burden that would be imposed upon processing resources associated with the store process 145 if the store process were to concurrently process all in-progress agent transactions 182 as well as the newly assigned agent transaction 182.

In step 265, the store process 145 determines if the new collective transaction weight is not within an acceptable collective transaction weight threshold and if so, the store process 145 queues the newly received agent transaction 182 within an agent transaction queue. In other words, in step 265, if the additional transaction weight associated with the recently received agent transactions 182 would cause the value of the new collective transaction weight to exceed acceptable collective transaction weight threshold, then the store process 145 does not begin processing the newly assigned agent transaction, but rather queues this transaction 182 within an agent transaction queue of pending agent transactions 182 that are received and assigned to this store process 145 but that are not yet being worked on or processed by the store process 145.

In step 266, if the new collective transaction weight is within an acceptable collective transaction weight threshold, then the store process 145 processes the agent transactions 182 within the store process 145 in order to convert management data 162 in the agent transaction 182 into managed object data 160 in the management database 161 accessed by the management application 132. In this manner, if the additional agent transaction 182 would not cause the store process 145 to exceed its collective transaction weight threshold, processing of the newly received agent transactions 182 begins in step 266.

In step 267, the store process 145 iteratively performs the processing of sub-steps 268 and 269 in order to continually monitor the collective transaction weight being experienced by the store process 145 to determine if any current or pending agent transactions 182 can be selected for processing.

Specifically, in step 268 the store process 145 selects an agent transaction 162 from the agent transactions queue 195 to be processed by the store process 145 that has an associated transaction weight that, when summed with the current collective transaction weight of the store process 145, produces a new collective transaction weight that is within the acceptable collective transaction weight threshold. In this manner, in step 268, the store process 145 proceeds to select pending or queued agent transactions 182 that can be concurrently performed with the set of active or in-progress agent transactions but that will not cause the new collective sum of agent transaction weights to exceed the collective transaction weight threshold.

In step 269, the store process 145 removes the processed agent transaction 182 from the agent transactions queue once it has begun performing that transaction. In this manner, the processing of step 268 and 269 operate to empty the agent transactions queue 195 during instances when the current collective transaction weight is within acceptable collective transaction weight threshold. Accordingly, the aforementioned embodiments of the store process 145 operate to optimally process agent transactions 182 by remaining fully occupied (i.e., busy) so that processing resources are maximized by the store process 145 while at the same time not exceeding processing resource limits which could results in efficiencies of processing agent transactions 182. By combining the aforementioned store processing operations with the aforementioned load manager agent transaction assignment and load balancing techniques, embodiments of the invention significantly increase the reliability, performance and efficiency with which agents are assigned to store processes for processing of agent transactions in order to collect management data within a network management application such as that used in a storage area network environment. After step 269 is complete, the processing of the steps in FIG. 6 can repeat within the store processes 145.

The store processes 145 performing the processing operations in FIG. 6 can operate as software processes within a computer system architecture similar to that of FIG. 5. In such a configuration, that the load manager application and process in FIG. 5 would be replaced by a store application and process and the agent wait table 133 and load table 134 would not be required in the memory 112. In such an embodiment, the store process would execute on the processor 113 and could maintain any required data structures, such as a transaction queue and collective transaction weights, within the memory 112. It is intended that the processing operations explained herein for the load manager 135, the agents 155 and the store processes 145 are operable on any suitable computing system architecture that may be dedicated for that processing, or that may share processing tasks with other software components.

It is to be understood that various alternative configurations can be provided by embodiments of the invention other than those discussed above. As an example, instead of the store processes 145 calculating a new collective transaction weight, in alternative embodiment of the invention, the store processes 145 can report current collective transaction weight of all currently assigned transactions within the load information 180 received by the load manager for each of the store processes 145. In addition, in such an embodiment, the store assignment request 181 received from an agent 155 has an associated transaction weight of the agent transaction 182 to be performed by a store process 145. Based on the aforementioned disclosure, those skilled in the art will understand that this alternative embodiment of the invention allows the load manager 135 to use this information (i.e., to use the collective transaction weight of all transactions in progress within a store process 145 and the transaction weight associated with an agent transaction to be performed with a store process) in order to allow the load manager 135 to calculate a new collective transaction weight for each store processes 145 as the sum of the current collective transaction weights for that store processes (i.e., the load manager 135 can track assigned transactions) and the requested transaction weight of the agent transactions to be assigned to a store process.

In this manner, the load manager 135 can compute a new collective transaction weight for each prospective store process 145 to which an agent can be assigned for performance of the agent transaction 182. Using this information, the load manager 135 configured according to such an embodiment determines if there is at least one store process 145 of the plurality of store processes that has a new collective transaction weight that is within an acceptable collective transaction weight threshold. In other words, the processing explained above with respect to FIG. 6 can be performed by the load manager 135 to take into account transaction weights of assigned transactions that the load manager 135 can track over time (since it is responsible for assigning transaction to store processes). If the new collective transaction weight for a particular store process is within the acceptable collective transaction weight threshold, then the load manager 135 can assign that store process 145 that has the new collective transaction weight within the acceptable collective transaction weight as the selected store process for use in processing the agent transaction 182 for the requesting agent 155. In response to this determination, the load manager 135 can forward the store assignment response 183 identifying the selected store process 145 to the agent 155 providing the store assignment request 181. In this manner, either the load manager 135 in some embodiments of the invention or, in other embodiments of the invention the store process 145, can use transaction weights associated with agent transactions 182 to further assists in selecting store process 145 for assignment to process agent transactions 182 on behalf of agents 155.

It is to be understood that in one embodiment of the invention the management application or server 132 is a storage area network management application. In such an embodiment, the store assignment requests 181 are received from agent processes 155 operating on host computer systems 150 within a storage area network 100 that collect management data 162 on behalf of managed entities associated with those agent processes 155. The agent processes 155 transfer the management data 162 within the agent transactions 182 to the store processes 145 to which they are assigned as explained herein. Also in such embodiments, the store processes 145 operate to process the agent transactions 182 to store the management data 162 into a management database 161 as managed object data 160. By periodically performing the processing steps explained above, embodiments of the invention can provide real-time or near real-time collection of management data 162 from various managed entities operating within a storage area network 100. This managed object data 160 can be accessed by the management application for use in making management decisions of managed entities within a storage area network 100.

In another alternative, the agents 155 can send a store assignment request 181 to the load manager 135 and can then wait for the load manager 135 to assign a store process 145 without requiring the agents 155 to re-send successive store assignment requests. This alternative provides an asynchronous dialog between the agents 155 and load manager 135.

Other alternative arrangements of the invention include rearranging the processing steps explained above in the flow charts in such a way that the overall effect of the invention is the same. It is to be thus understood by those skilled in the art that the particular arrangement of processing steps in many instances does not specify implementation of embodiments of the invention. As such, those skilled in the art of software development and computer-related technologies will understand that there can be many ways and orders of representing the processing operations explained above and such alternative software code will still achieve the overall effects explained herein. In addition, embodiments of the invention are not limited to operation on the computer systems 130, 140 and 150 shown above. The agents 155, store processes 145 and management server 132 (including load manager 135) can operate on shared computing resources, or can be distributed among any number of computer systems. Furthermore, embodiments of the invention are not limited to operation in a storage area network management application, but are intended to be generally applicable to any type of management application. Accordingly, embodiments of the invention are not limited to the processing arrangements explained above.

What is claimed is:

1. A computer-implemented method for processing information in a management application in which at least one computer system accesses instructions from computer storage and executes the instructions to perform steps of:

receiving at least one first store assignment request from at least one first agent that has an agent transaction to perform with a store process from a plurality of store processes, the agent transaction for processing management data via a store process assigned to the agent transaction in order to convert the management data into a managed data object, the management data collected by the first agent;

determining an existence of a non-available store condition in which received load information from each store process in the plurality of store processes is not within an acceptable threshold load factor range, the load information received from each store process indicating a relative processing load for the store process;

in response to determining the existence of the non-available store condition, maintaining an agent wait table containing an agent entry for each agent sending store assignment requests during the non-available store condition, each agent entry identifying a wait threshold time specific to a corresponding agent and further identifying the store assignment request associated with the corresponding agent;

assigning a first store process from the plurality of store processes for the first agent to use to perform the agent transaction based on a store process availability of the first store process;

after assignment of the first store process for the first agent, establishing a recently assigned agent condition associated with the first store process, the recently assigned agent condition defining an acceptable number of agents assigned to the first store process during a predetermined agent assignment interval, whereby:

if the recently assigned agent condition associated with first store process equals the acceptable number of agents during the predetermined agent assignment interval, selecting a store process from the plurality of store processes for processing a second agent transaction other than the first store process to which the recently assigned agent condition applies; and clearing the recently assigned agent condition after the predetermined agent assignment interval has elapsed.

2. The computer-implemented method of claim 1, comprising:

for each store process of the plurality of store processes, determining store process availability based on the received load information, comprising:
i) if the load information for the store process is within the acceptable threshold load factor range, identifying the store process as an available store process within the plurality of store processes; and
ii) if the load information for the store process is not within the acceptable threshold load factor range, identifying the store process as an unavailable store process within the plurality of store processes.

3. The computer-implemented method of claim 1, wherein maintaining the agent wait table comprises:

if a wait time for an agent identified in an agent entry in the agent wait table exceeds the agent's specific wait threshold time, identifying the agent entry in the agent wait table as a starving agent entry.

4. The computer-implemented method of claim 3, wherein assigning the first store process comprises:

if there is at least one starving agent entry identified in the agent wait table, and if the store assignment request is received from an agent associated with a starving agent entry, and if there is at least one store process of the plurality of store processes that is identified as an available store process, then:
i) assigning an available store process of the plurality of store processes that has the most favorable load information as a selected store process for use in processing the agent transaction for the agent identified in the starving agent entry in the agent wait table; and
ii) forwarding a store assignment response identifying the selected store process to the agent providing the store assignment request corresponding to the starving agent entry in the agent wait table; and
iii) removing the starving agent entry from the agent wait table.

5. The computer-implemented method of claim 1, wherein assigning the first store process comprises:

if there is at least one starving agent entry identified in the agent wait table and the store assignment request is received from an agent that is not associated with a starving agent entry, then:
i) updating the agent entry associated with the agent that provided the store assignment request in the agent wait table to indicate receipt of the store assignment request; and
ii) skipping assignment of an available store process to the agent that provided the store assignment request in order to wait for receipt of a store assignment request from an agent associated with a starving agent entry in the agent wait table.

6. The computer-implemented method of claim 1, wherein maintaining the agent wait table comprises:

identifying when an agent entry in the agent wait table has received no store assignment requests for a predetermined agent timeout period and in response, identifying the agent entry associated with the agent in the agent wait table as a non-responding agent.

7. The computer-implemented method of claim 1, wherein assigning the first store process comprises:

determining if there is at least one store process of the plurality of store processes that is identified as an available store process, and if so:
i) assigning a store process of the plurality of store processes that has the most favorable load information as a selected store process for use in processing the agent transaction for the agent; and
ii) forwarding a store assignment response identifying the selected store process to the agent providing the store assignment request.

8. The computer-implemented method of claim 1 comprising:

repeating the steps of receiving, determining, maintaining, assigning and establishing such that, over time, assignment of store processes to handle processing of agent transactions associated with a plurality of agents is load balanced across the plurality of store processes based on the load information received from the store processes.

9. The computer-implemented method of claim 1, wherein:

the load information received from the plurality of store process includes a current collective transaction weight of all currently assigned transactions for each store process; and the first store assignment request received from the first agent has an associated transaction weight of the agent transaction to be performed with a store process;

and wherein assigning the first store process comprises:

for each available store process, calculating a new collective transaction weight as a sum of the current collective transaction weight and the transaction weight of the agent transaction to be performed with the first store process;

determining if there is at least one store process of the plurality of store processes that has a new collective transaction weight that is within an acceptable collective transaction weight, and if so:
i) assigning a store process of the plurality of store processes that has the new collective transaction weight that is within an acceptable collective transaction weight as a selected store process for use in processing the agent transaction for the agent; and
ii) forwarding a store assignment response identifying the selected store process to the agent providing the store assignment request.

10. The computer-implemented method of claim 9, wherein:

the management application is a storage area network management application;

the store assignment requests are received from agent processes operating on host computer systems in the storage area network that collect management data on behalf of managed entities associated with the agent processes, the agent processes transferring the management data within agent transactions to store processes to which they are assigned; and the plurality of store processes operate to process the agent transactions to store the management data into a management database on behalf of the plurality of agent processes.

11. A computer system comprising:

a memory;

a processor;

a communications interface;

an interconnection mechanism coupling the memory, the processor and the communications interface;

wherein the memory is encoded with a load manager application that when performed on the processor, provides a load manager process for processing information in a management application, the load manager process causing the computer system to perform the operations of:

receiving at least one first store assignment request from at least one first agent that has an agent transaction to perform with a store process from a plurality of store processes, the agent transaction for processing management data via a store process assigned to the agent transaction in order to convert the management data into a managed data object, the management data collected by the first agent;

determining an existence of a non-available store condition in which received load information from each store process in a plurality of store processes is not within an acceptable threshold load factor range, the load information received from each store process indicating a relative processing load for the store process;

in response to determining the existence of the non-available store condition, maintaining an agent wait table containing an agent entry for each agent sending store assignment requests during the non-available store condition, each agent entry identifying a wait threshold time specific to a corresponding agent and further identifying the store assignment request associated with the corresponding agent;

assigning a first store process from the plurality of store processes for the first agent to use to perform the agent transaction based on a store process availability of the first store process;

after assignment of the first store process for the first agent, establishing a recently assigned agent condition associated with the first store process, the recently assigned agent condition defining an acceptable number of agents assigned to the first store process during a predetermined agent assignment interval, whereby:

if the recently assigned agent condition associated with first store process equals the acceptable number of agents during the predetermined agent assignment interval, selecting a store process from the plurality of store processes for processing a second agent transaction other than the first store process to which the recently assigned agent condition applies; and clearing the recently assigned agent condition after the predetermined agent assignment interval has elapsed.

12. The computer system of claim 11, wherein when the load manager process causes the computer system to perform the operation of comprising:

for each store process of the plurality of store processes, determining store process availability based on the received load information, comprising:

i) if the load information for the store process is within the acceptable threshold load factor range, identifying the store process as an available store process within the plurality of store processes; and ii) if the load information for the store process is not within the acceptable threshold load factor range, identifying the store process as an unavailable store process within the plurality of store processes.

13. The computer system of claim 11, wherein when the load manager process causes the computer system to perform the operation of maintaining the agent wait table comprising:

if a wait time for an agent identified in an agent entry in the agent wait table exceeds the agent's specific wait threshold time, identifying the agent entry in the agent wait table as a starving agent entry.

14. The computer system of claim 13, wherein when the load manager process causes the computer system to perform the operation of assigning the first store process comprising:

if there is at least one starving agent entry identified in the agent wait table, and if the store assignment request is received from an agent associated with a starving agent entry, and if there is at least one store process of the plurality of store processes that is identified as an available store process, then:

i) assigning an available store process of the plurality of store processes that has the most favorable load information as a selected store process for use in processing the agent transaction for the agent identified in the starving agent entry in the agent wait table; and ii) forwarding a store assignment response identifying the selected store process to the agent providing the store assignment request corresponding to the starving agent entry in the agent wait table; and iii) removing the starving agent entry from the agent wait table.

15. The computer system of claim 11, wherein when the load manager process causes the computer system to perform the operation of assigning the first store process comprising:

if there is at least one starving agent entry identified in the agent wait table and the store assignment request is received from an agent that is not associated with a starving agent entry, then:

i) updating the agent entry associated with the agent that provided the store assignment request in the agent wait table to indicate receipt of the store assignment request; and ii) skipping assignment of an available store process to the agent that provided the store assignment request in order to wait for receipt of a store assignment request from an agent associated with a starving agent entry in the agent wait table.

16. The computer system of claim 11, wherein when the load manager process causes the computer system to perform the operation of maintaining the agent wait table comprising:

identifying when an agent entry in the agent wait table has received no store assignment requests for a predetermined agent timeout period and in response, identifying the agent entry associated with the agent in the agent wait table as a non-responding agent.

17. The computer system of claim 11, wherein when the load manager process causes the computer system to perform the operation of assigning the first store process comprising:

determining if there is at least one store process of the plurality of store processes that is identified as an available store process, and if so:

i) assigning a store process of the plurality of store processes that has the most favorable load information as a selected store process for use in processing the agent transaction for the agent; and ii) forwarding a store assignment response identifying the selected store process to the agent providing the store assignment request.

18. The computer system of claim 11 wherein when the load manager process causes the computer system to perform the operations of:

repeating the steps of receiving, determining, maintaining, assigning and establishing such that, over time, assignment of store processes to handle processing of agent transactions associated with a plurality of agents is load balanced across the plurality of store processes based on the load information received from the store processes.

19. The computer system of claim 11, wherein:

the load information received from the plurality of store process includes a current collective transaction weight of all currently assigned transactions for each store process; and the first store assignment request received from the first agent has an associated transaction weight of the agent transaction to be performed with a store process;

and wherein assigning the first store process comprises:

for each available store process, calculating a new collective transaction weight as a sum of the current collective transaction weight and the transaction weight of the agent transaction to be performed with the first store process;

determining if there is at least one store process of the plurality of store processes that has a new collective transaction weight that is within an acceptable collective transaction weight, and if so:

i) assigning a store process of the plurality of store processes that has the new collective transaction weight that is within an acceptable collective transaction weight as a selected store process for use in processing the agent transaction for the agent; and ii) forwarding a store assignment response identifying the selected store process to the agent providing the store assignment request.

20. The computer system of claim 19, wherein:

the management application is a storage area network management application;

the store assignment requests are received from agent processes operating on host computer systems in the storage area network that collect management data on behalf of managed entities associated with the agent processes, the agent processes transferring the management data within agent transactions to store processes to which they are assigned; and the plurality of store processes operate to process the agent transactions to store the management data into a management database on behalf of the plurality of agent processes.

21. A computer program product having a computer readable medium including computer program logic encoded thereon that, when executed on a computer system provides a method for processing information in a management application by causing the computer system to perform the operations of:

receiving at least one first store assignment request from at least one first agent that has an agent transaction to perform with a store process from a plurality of store processes, the agent transaction for processing management data via a store process assigned to the agent transaction in order to convert the management data into a managed data object, the management data collected by the first agent;

determining an existence of a non-available store condition in which received load information from each store process in a plurality of store processes is not within an acceptable threshold load factor range, the load information received from each store process indicating a relative processing load for the store process;

in response to determining the existence of the non-available store condition, maintaining an agent wait table containing an agent entry for each agent sending store assignment requests during the non-available store condition, each agent entry identifying a wait threshold time specific to a corresponding agent and further identifying the store assignment request associated with the corresponding agent;

assigning a first store process from the plurality of store processes for the first agent to use to perform the agent transaction based on a store process availability of the first store process;

after assignment of the first store process for the first agent, establishing a recently assigned agent condition associated with the first store process, the recently assigned agent condition defining an acceptable number of agents assigned to the first store process during a predetermined agent assignment interval, whereby:

if the recently assigned agent condition associated with first store process equals the acceptable number of agents during the predetermined agent assignment interval, selecting a store process from the plurality of store processes for processing a second agent transaction other than the first store process to which the recently assigned agent condition applies; and clearing the recently assigned agent condition after the predetermined agent assignment interval has elapsed.

* * * * *